United States Patent
Thielemann et al.

(10) Patent No.: US 9,678,603 B2
(45) Date of Patent: Jun. 13, 2017

(54) SYNCHRONIZED MULTI-DEVICE TRANSMISSIONS

(75) Inventors: Jens T. Thielemann, Oslo (NO); Tom Øystein Kavli, Nittedal (NO)

(73) Assignee: ELLIPTIC LABORATORIES AS, Oslo (NO)

(*) Notice: Subject to any disclaimer, the term of this patent is extended or adjusted under 35 U.S.C. 154(b) by 117 days.

(21) Appl. No.: 14/008,293

(22) PCT Filed: Mar. 28, 2012

(86) PCT No.: PCT/GB2012/050684
§ 371 (c)(1),
(2), (4) Date: Oct. 15, 2013

(87) PCT Pub. No.: WO2012/131359
PCT Pub. Date: Oct. 4, 2012

(65) Prior Publication Data
US 2014/0028632 A1  Jan. 30, 2014

(30) Foreign Application Priority Data

Apr. 1, 2011  (GB) .................................. 1105588.6

(51) Int. Cl.
*G06F 3/043* (2006.01)
*G06F 3/041* (2006.01)

(52) U.S. Cl.
CPC ............ *G06F 3/043* (2013.01); *G06F 3/0416* (2013.01)

(58) Field of Classification Search
CPC ... G01S 7/52004; G01S 7/52014; G06F 3/041
See application file for complete search history.

(56) References Cited

U.S. PATENT DOCUMENTS

| | | | | |
|---|---|---|---|---|
| 4,303,983 A | * | 12/1981 | Chaborski | G04F 10/00 377/20 |
| 4,845,682 A | * | 7/1989 | Boozer | G01S 7/527 340/552 |
| 5,079,751 A | * | 1/1992 | Woodward | G01S 7/003 367/96 |
| 5,355,130 A | * | 10/1994 | Luber | H03K 17/94 327/141 |

(Continued)

FOREIGN PATENT DOCUMENTS

EP  0 899 651  3/1999
WO  WO 2011042748 A2 * 4/2011

OTHER PUBLICATIONS

International Search Report dated Aug. 6, 2012 from International Application No. PCT/GB2012/050684.

(Continued)

*Primary Examiner* — Benjamin C Lee
*Assistant Examiner* — Dong Hui Liang
(74) *Attorney, Agent, or Firm* — Beyer Law Group LLP

(57) ABSTRACT

In a method of operating at least first and second electronic devices, the devices are each arranged to transmit and receive ultrasonic signals, e.g. to operate a touchless user interface. Both devices, or at least two of the devices, are synchronised to transmit said signals at substantially the same time. The devices may, for example, listen to each other's ultrasonic signals or use a WiFi network access point for synchronization.

14 Claims, 15 Drawing Sheets

(56) References Cited

U.S. PATENT DOCUMENTS

| | | | | |
|---|---|---|---|---|
| 5,524,627 | A * | 6/1996 | Passi | B82Y 15/00 600/445 |
| 6,377,515 | B1 * | 4/2002 | Healey | G01S 7/003 367/87 |
| 6,819,629 | B2 * | 11/2004 | Cummings | G01S 7/537 367/98 |
| 7,525,050 | B1 * | 4/2009 | Weaver | G06F 3/0433 178/18.04 |
| 2002/0114303 | A1 * | 8/2002 | Crosbie | H04B 7/269 370/338 |
| 2006/0136544 | A1 * | 6/2006 | Atsmon | G01S 5/22 709/200 |
| 2006/0161871 | A1 | 7/2006 | Hotelling et al. | |
| 2006/0217065 | A1 * | 9/2006 | Spilo | H04B 17/23 455/41.2 |
| 2008/0084789 | A1 | 4/2008 | Altman | |
| 2009/0214039 | A1 * | 8/2009 | Chen | H04W 4/02 380/270 |
| 2010/0141392 | A1 * | 6/2010 | Jo | G06K 7/0008 340/10.2 |
| 2010/0207737 | A1 * | 8/2010 | Park | G06K 7/0008 340/10.2 |
| 2011/0003614 | A1 * | 1/2011 | Langereis | G01S 15/06 455/550.1 |
| 2011/0132093 | A1 * | 6/2011 | Citta | G01S 7/52006 73/632 |
| 2011/0255528 | A1 * | 10/2011 | Zakrzewski | H04W 56/009 370/350 |
| 2012/0313900 | A1 * | 12/2012 | Dahl | G06F 3/043 345/177 |
| 2013/0050080 | A1 * | 2/2013 | Dahl | G01S 5/18 345/158 |

OTHER PUBLICATIONS

Written Opinion dated Aug. 6, 2012 from International Application No. PCT/GB2012/050684.

* cited by examiner

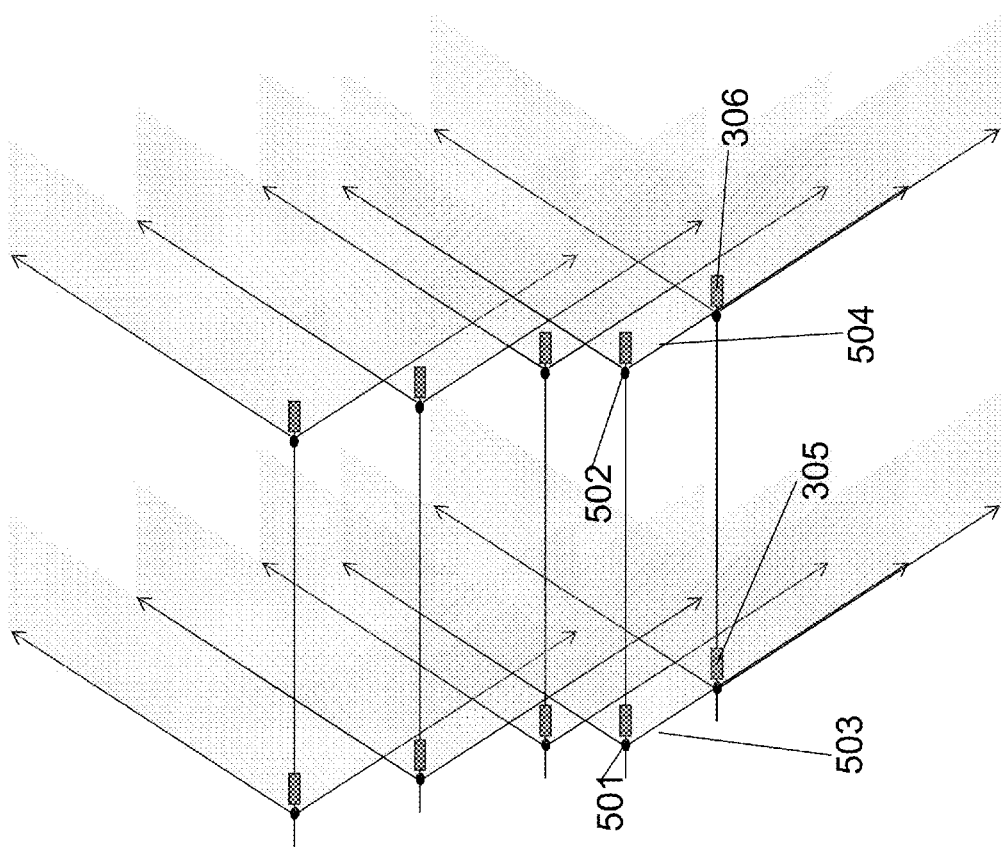
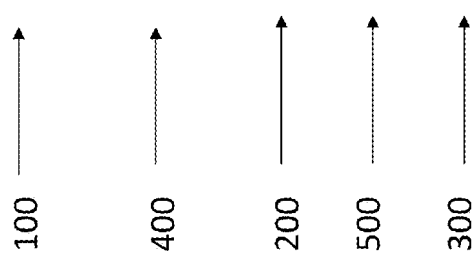
Fig 11

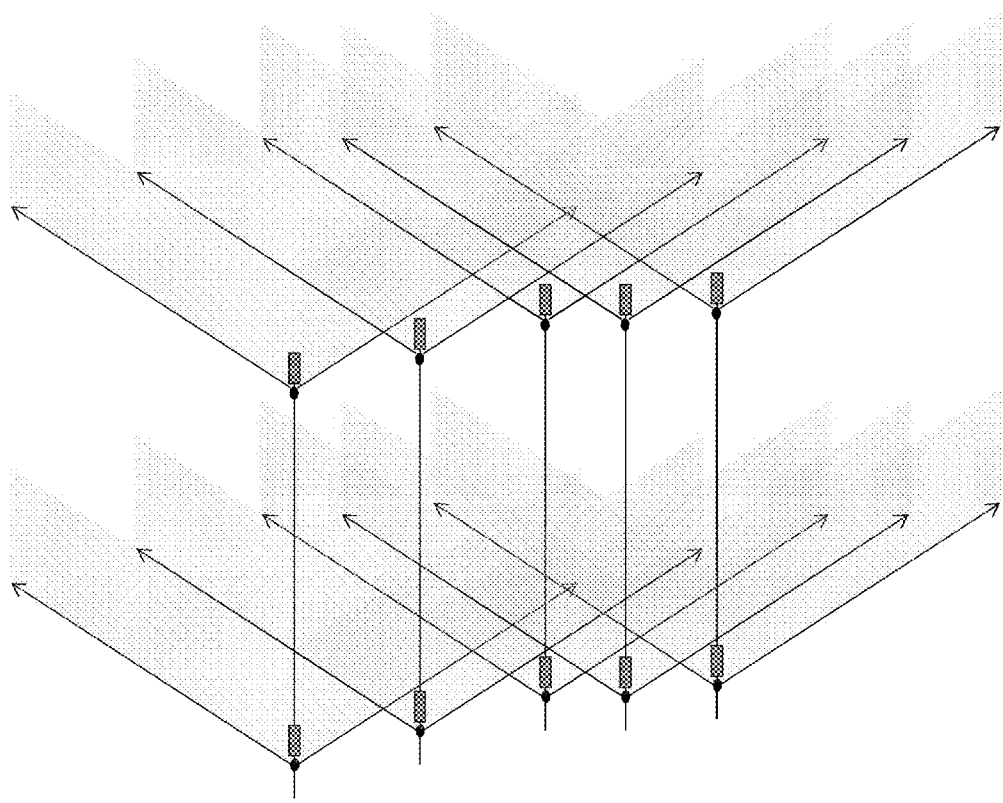
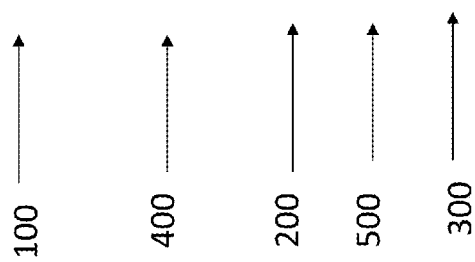
Fig 12

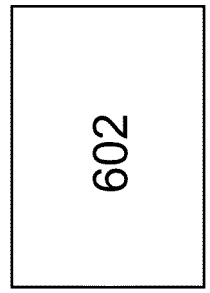
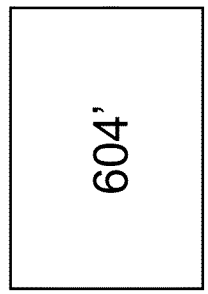
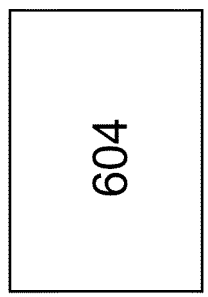
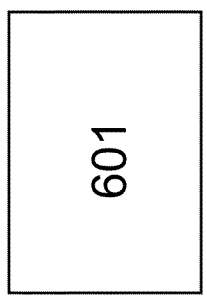
Fig 15

SYNCHRONIZED MULTI-DEVICE TRANSMISSIONS

This invention relates to user interfaces for electronic devices. It relates particularly to interfaces which involve characterising the motion of one or more objects using acoustic signals; especially, but not exclusively, ultrasound signals and to the operation of multiple such devices in the vicinity of one another.

It is known to track an object for touchless interaction with a computing device with an ultrasonic transmitter and a number of receivers using time-of-flight measurements. Indeed various proposals for such tracking have been made—e.g. in US patent application US 2006/0161871 by Apple, which relates particularly to input to a handheld device by a user's finger. However these proposals have shortcomings. In particular, they can be sensitive to interference from echoes caused by other objects and from active sources of noise.

Optical tracking based on time-of-flight principles has also been attempted; however, the technology is complex and costly, due in part to the need for optical components and the very high clock-speeds required. Furthermore, it is impossible to flush-mount a camera having a wide (e.g. 180-degree) field of view, meaning that camera lenses must partly project from the surface of the device so that they are exposed to damage and contamination, as well as being potentially less aesthetically-pleasing.

Interference is particularly problematic in acoustic tracking systems, compared with optical ones, due to the wider dispersion characteristics and much lower speed of sound waves.

The inventors have recognised a particular problem when two or more devices, especially mobile devices, attempt to use acoustic input systems within audible range of each other. They are likely to interfere with each other, especially when they are configured to transmit similar or identical acoustic signals to each other (e.g. in the same frequency range). In such situations, using prior art approaches, one device will typically be unable to distinguish between reflections from an object of interest and sound resulting from the other device. This can lead to a failure to recognise a user input correctly. In particular, the direct path sound from the other device may be many times stronger than the reflection from the input object, and can therefore swamp the echoes if they overlap in time of receipt. Since users typically have a low tolerance to input failures, this can be a very serious problem. As the number of devices employing acoustic input mechanisms increases, the incidences of multiple devices being within audible range of each other is set to increases.

The present invention aims to overcome these shortcomings in known approaches.

When viewed from a first aspect the invention provides a method of operating two or more electronic devices, said devices each arranged to transmit and receive ultrasonic signals, the method further comprising synchronising both devices, or at least two of said devices, to transmit said signals at substantially the same time.

The invention extends to an electronic device comprising a transmitter and a receiver for respectively transmitting and receiving ultrasonic signals, said device being configured so as to synchronise with at least one further electronic device having a transmitter and receiver respectively for transmitting and receiving ultrasonic signals in order to transmit said signals at substantially the same time.

The invention further extends to a computer software product, whether or not on a carrier, which is adapted, when run on suitable data processing means controlling an electronic device having a transmitter and a receiver, to transmit and receive ultrasonic signals, and to synchronise with at least one further electronic device having a transmitter and receiver respectively for transmitting and receiving ultrasonic signals in order to transmit said signals at substantially the same time.

Thus it will be seen that in accordance with the invention devices which transmit ultrasound signals, which are at risk of interfering with one another, cooperate with one another to synchronise their transmissions. This appears counter-intuitive since it might be presumed that interference is best avoided by ensuring that the devices transmit at different times, especially when, as is typical, the transmission repetition rate is low enough that signals reflected from an input object arrive only during a minor portion of the frame duration. However the inventors have appreciated that although this may be a suitable method with a small number of devices (say 2 or 3) that do not move relative to one another, it is not very scalable when there are larger numbers of devices within range of each other and/or which move relative to one another since the optimal timing will change when the distances between the devices change. Moreover the inventors have appreciated that it is not actually necessary for devices to transmit at different times and that it is generally more beneficial to synchronise.

The devices could be of any particular type and need not be of the same type as each other. More particularly the ultrasonic signals transmitted may perform any of a number of different roles. For example the ultrasonic signals could be used for measurement or range finding, transferring data or even for controlling animals. In a set of preferred embodiments the signals are used as part of a user control interface. In a set of embodiments the first device is arranged to receive reflections of the transmitted signals from an input object and to control a function of the device in dependence on the received reflections from the input object. In other words the first device preferably comprises a touchless interface. The second device may also have this feature but need not.

In another alternative the first device is arranged to collaborate with the second device to implement a feature involving both devices. For example the first device could determine the location and/or movement of the second device from the timing of the received signals and use this as an input to an application such as a game or a social networking application.

When viewed from a second aspect the invention provides a method of operating two or more electronic devices, said devices each transmitting respective signals, receiving reflections of the respective transmitted signals and each device controlling a function thereof in dependence on said received reflection, the method further comprising: transferring information between the devices; and one or both of said devices altering the signals it transmits based on said information such that the devices transmit said respective transmitted signals at substantially the same time.

If transmissions are synchronised, the time at which a first device receives the transmissions directly from a second device will depend simply on their mutual separation. As long as this separation is more than the maximum roundtrip distance of a signal from the first device to an input object and back, there will not in practice be interference between the signals. By defining a region-of-interest (ROI) around the first device, that is a zone in which an input object may be expected to be influence the first device, an 'exclusion zone' may be defined which is at least twice as far away from the device. The exclusion zone is the zone in which another device should not be placed in order to avoid potential interference. To give an example the devices may be designed to be operated by an input object within a radius of 30 cm. The exclusion zone would therefore be at least 60 cm (maybe 70 cm to give a margin of error) to avoid interference between the synchronised signals.

As well as receiving directly the signals transmitted by the second device, the first device will in general also receive reflections from the immediate environment (such as walls, furniture etc.) and from any input object within the ROI of the second device. However the latter reflections will, by definition, have a longer time-of-flight than the direct path signals and will therefore be further away in time from reflections from the input object in the first ROI.

By ensuring that devices are not inside each other's exclusion zones (i.e. that they are separated by more than twice the maximum extent of the ROI of either) and that their transmissions are synchronised, their signals can be distinguished from one another, regardless of the number of devices in the vicinity of each other.

The first device may be arranged only to respond to signals received from within the ROI, which implies processing signals received within a limited time window after each transmission. This automatically ensures that signals from outside the exclusion zone will be ignored. It is not essential however. For example, signals outside the ROI could still be processed as inputs if sufficiently clear. More significantly in a preferred set of embodiments the first device is configured to process the signals from the second device. Advantageously for example the time of receipt of the signal from the second device will give an estimate of the separation between the two devices given that the time of transmission is known (since the devices are synchronised). Thus in a set of embodiments the method comprises the first device receiving the signal from the second device and calculating a separation between the first and second devices. The calculated separation could be displayed on the first device or otherwise communicated to a user.

In a set of embodiments the first device is configured such that if it becomes aware that another device is within its exclusion zone it gives a warning to the user. The could be visual, audible, haptic or a combination thereof. The first device could be configured to attempt to interpret a reflection from its input object nonetheless or it could be configured to suspend inputs until the second device has been sufficiently far removed. In one set of embodiments the first device is arranged to switch to another interference-avoiding algorithm—e.g. deliberately moving the timing of its transmissions so as not to be synchronous with the second device but rather to transmit in a part of the frame away from the transmissions and reflections thereof from the second device in the manner discussed earlier. If the first device detects that switching to another interference-avoiding algorithm has still not resolved the problem, it may then issue a notification to a user (by any suitable means) and suspend its own transmissions (and thereby say its touchless interaction mode) until its region of interest is clear again, If the first device detects a second device it could be configured to communicate this to the second device since the first device is also likely to be in the ROI of the second device, e.g. if the respective ROIs are of the same or similar size. The second device may then take similar corresponding action such as issuing a warning.

The aforementioned communication could take place either way (e.g. initiated by either the first or second device) and thus for each device the warning may be triggered either by detection by the device itself or by receipt of a message from the other device. The communication may be acoustic e.g. ultrasound, or electromagnetic, such as radio-frequency or optical. The communication may be over the same medium as the said transmitted signals or over a different medium. The communication may be unidirectional or bi-directional—e.g. with acknowledgment of a received message being sent by the recipient. In some embodiments, the said transmitted signals are ultrasound and the communication occurs over an RF channel. In other embodiments, the information transfer happens over an ultrasound channel. This could be the same channel on which the signals are transmitted, e.g. in the same frequency band and/or using the same protocol and/or using the same coding. Alternatively one or more separate ultrasound channels could be utilised—e.g. based on different frequencies.

The degree of synchronisation in accordance with the invention may depend on the application; perfect synchronisation is not essential. Where reference is made herein to devices transmitting at substantially the same time this should be understood to mean that there is no deliberate delay between them. However they may in practice have an unavoidable mutual delay.

There are several different ways in which synchronisation between two or more devices in accordance with the invention can be achieved. In one set of embodiments synchronisation is achieved by the devices acting on the normal signals transmitted by other devices—i.e. there is no independent synchronisation signal. Typically such synchronisation will approach simultaneous transmission iteratively but may never achieve it perfectly. In a set of such embodiments the first device is configured to transmit signals periodically but sometimes to refrain from transmitting a signal when dictated by the periodicity. This allows the first device to listen to transmissions from other devices and to adjust its transmissions accordingly.

Preferably the first device is configured to adjust its subsequent transmissions so that a time window corresponding to its region of interest (that is the round-trip time of flight for a signal reflected from an object in the region of interest) occurs before a signal from a second device is received.

This is novel and inventive in its own right and thus when viewed from a further aspect the invention provides a method of operating an electronic device comprising transmitting interface signals with a predetermined period, receiving reflections of the interface signals and controlling a function of the device in dependence on said received reflection, the method further comprising refraining from making one or more interface signal transmissions, receiving a signal having said predetermined period from a second device and altering said transmission of interface signals such that there is a predetermined interval between transmission of said interface signals and receipt of the signals from the second device.

By setting the aforementioned predetermined time to be at least the length of the time window corresponding to the region of interest, this avoids interference between the devices.

The interval between the transmissions from the first device and the signal received from the second device and could be variable but is preferably fixed. Where signals are received from a plurality of other devices the first device preferably recommences transmission of its signals before the strongest of the signals from the other units is received. Additionally or alternatively the first device recommences transmission in the latest available quiet period before the arrival of this signal It has been found that as long as the devices are not too close to one another, this tends towards a stable arrangement in which all the devices transmit at substantially the same time as the devices move and more devices are added.

The first device may be configured to skip one or more transmissions regularly, say every tenth transmission, or randomly but preferably with a defined average. In a set of embodiments the first device is configured when starting transmissions to listen for transmission from other devices and to initiate transmission so that a time window corresponding to its region of interest occurs before all signals from other devices are received—i.e. to follow the same procedure outlined above for when it skips a transmission.

In another set of embodiments synchronisation to mediated by means of an independent synchronisation signal. This could be sent between devices or derived form an external source—e.g. a cellular mobile network or a satellite signal such as GPS. The sync signal may be acoustic e.g. ultrasound, or electromagnetic, such as radio-frequency or optical. The signal could be sent over the same medium as the said transmitted signals or over a different medium. The communication may be unidirectional or bi-directional—e.g. with acknowledgment of a received message being sent by the recipient. In some embodiments, the said transmitted signals are ultrasound and the communication occurs over an RF channel. In other embodiments, the information transfer happens over an ultrasound channel. This could be the same channel on which the signals are transmitted, e.g. in the same frequency band and/or using the same protocol and/or using the same coding. Alternatively one or more separate ultrasound channels could be utilised—e.g. based on different frequencies.

The use of an additional electromagnetic channel such as a radio frequency channel is beneficial since it allows rapid synchronisation of any number of devices in range. It also allows a reliable estimate of the separation of devices to be achieved. A dedicated radio channel could theoretically be employed. However this would carry the disadvantage of requiring extra hardware.

In a set of embodiments the devices are adapted to use signals transmitted as part of a wireless data network to synchronise their transmissions. The Applicant has appreciated that such networks are generally controlled by accurate clocks and furthermore that they transmit regular, time-stamped beacon signals. The advantage of using an existing wireless data network signal is that most electronic devices such as smartphones, tablets etc. already have built-in hardware capable of receiving these signals. The wireless data network could be a cellular data network such as GSM, GPRS, 3G or 4G. However in a set of embodiments it comprises an 802.11—i.e. a WiFi network. Conveniently the devices receive the signals directly from the network—e.g. from a router or access point in the case of WiFi. However it is not essential that they all receive it directly. A device which does receive it directly could transmit a synchronisation signal (e.g. re-transmitting the signal it receives from the network) to other devices.

The Applicant has realised that it is not essential for a device actually to be connected to the network in order to use signals transmitted by it for synchronisation. In at least some embodiments however this is preferred since in some networks, the signals which can be used for synchronisation are sent much more regularly to connected devices than the 'open' signals. However as indicated above it may be sufficient for just one device to be connected to the network and for this device to transmit synchronisation signals based on those it receives from the network.

In a set of embodiments each device is arranged regularly to estimate the offset between a local clock on the device and a clock on the network and also the rate at the which the offset is changing (drift). The offset and drift can be used by a device to apply a correction to its local clock and to ensure that it transmits signals—e.g. ultrasound signals—at the same time as other devices in the vicinity. This could be done for example by arranging for the devices to transmit at pre-agreed times based on the network clock.

In a set of embodiments the devices are arranged to calculate an index comprising a count of the number of ultrasound transmissions made from a given point (such as start-up). Since ultrasound transmissions are made regularly, this acts as a kind of clock. By associating each index with a timestamp from the local device clock, calculate the offset and drift between the local clock and the sample indices, use said drift and offset to convert times from the network clock to said index and transmit said ultrasonic signals based on said index. This can be seen as using the index as a mechanism for correcting the local clock and it may be beneficial in some implementations where network interface software drivers do not provide the necessary functionality to adjust the local clock.

Preferably each of the devices is arranged to receive a synchronisation signal from the same source, directly or indirectly. For example where the devices receive a synchronisation from a WiFi access point, they are preferably configured to synchronise using the signal from a given access point to synchronise, even though a given device may be closer to or connected to a different access point. Preferably the devices are arranged to communicate, either directly with one another or through a communications network, to coordinate which signal they will use for synchronisation.

In a set of embodiments all the devices are connected to the access point from which they receive the timing information they require for synchronisation. However this is not essential and in a set of embodiments, a device may be connected to a first access point but receive timing information for synchronisation from a second access point. In a set of such embodiments the device is arranged to calculate when a signal was received from the second access point using a timestamp from the first access point. In a set of embodiments the drift of the first and second access points is assumed to be the same.

In a set of embodiments the device comprises a local clock which is arranged so as to be used in conjunction with system calls. The Applicant has found that this can increase the accuracy of the local clock. For example in Windows 7® the system calls NtQueryTimerResolution and NtSetTimerResolution can be used to increase the local clock accuracy from 15 ms to 0.5 ms.

In one set of embodiments ultrasonic communication is used to synchronise two or more devices. This could be as an alternative to using RF signals as described above—e.g. for devices which do not have inbuilt radio receivers—or as a back-up where a suitable RF signal is not available. In a more particular set of such embodiments two separate ultrasonic channels are employed. The two channels could be separated in any suitable manner but preferably they have different frequencies. Preferably the first device is configured to transmit a sync signal on a first of the said channels during a first time slot and a second device is configured to receive said sync signal and to transmit a reply signal during a second time slot. Through knowledge of the lengths of the time slots (e.g. conveniently by setting them to the same length) the first device can use the time of receipt of the reply signal to determine the relative offset in time slots between the first and second devices and can thus adjust its transmissions so that they are synchronised. The first device can also use the aggregate time to determine the separation distance between the devices. As previously explained this is beneficial in being able to determine whether the second device is within the exclusion zone of the first device and thus whether a warning should be given or interface operation be suspended, or an alternative collision-avoidance algorithm attempted.

This approach to achieving synchronisation is novel and inventive in its own right and thus when viewed from a further aspect the invention provides a method of operating two or more electronic devices, said devices each transmitting respective interface signals, receiving reflections of the respective interface signals and each device controlling a function thereof in dependence on said received reflection, the method further comprising a second device receiving a synchronisation signal from a first device, the second device transmitting a reply signal which is received by the first device and said first device altering its interface transmission so as to be in closer synchrony with the interface transmissions of the second device.

The interface signals are preferably ultrasound signals. The synchronisation and reply signals are each preferably ultrasound signals but in neither case is this essential.

The synchronisation and reply signals are preferably transmitted on respective first and second channels.

An advantage of the approach set out above is that it can, at least in theory, provide full synchronisation between several devices. It also permits a warning to be given to a user if another device is too close or there are too many devices which are too close for say reliable touchless operation. More positively however the proximity of another device could be used to turn on a feature allowing them to interact functionally as described in our co-pending but application PCT/GB2010/051683 (unpublished at the date of filing of the present application), the contents of which are incorporated herein by reference. Another advantage the applicant has appreciated is that it is tolerant to relative movement between devices. Finally it allows the accommodation of devices newly entering the vicinity.

The first channel is preferably multiplexed so that it can be shared between a plurality of devices. It could, for example, be time-division multiplexed so that only one device can access it at any given time. In a set of embodiments the first channel comprises Carrier Sense Multiple Access/Collision Avoidance (CSMA/CA) which is well know per se e.g. from Ethernet protocols.

In accordance with foregoing aspects of the invention devices are preferably arranged to transmit their interface signals at the same time, or at least try to. The signals themselves could be different for different devices but advantageously they are the same. The signals transmitted by any one device could remain the same from one transmission to the next, but preferably they follow a repeating pattern. The pattern repeat is preferably sufficiently long that a given signal will have substantially died out before it is repeated. Quantitatively this might mean for example that the previous signal has reduced to less than 20%, or less than 10% of its original amplitude. Preferably the pattern repeats no more than 60 times a second, e.g. no more than 40 times per second.

The signals transmitted by the device could take any form but in a set of preferred embodiments they comprise chirps—that is signals of rising or falling frequency.

The electronic devices in accordance with either aspect of the invention could be static, portable or a mixture of the two.

The transmitters and receivers referred to herein need not be separate components; they could be embodied by the same transducer. It or they need not be a dedicated ultrasonic component(s); a transmitter and/or receiver designed for operation in the audible range may be usable at the required ultrasound frequencies.

Certain preferred embodiments of the invention will now be described, by way of example only, with reference to the accompanying drawings in which:

FIGS. 5 to 12 show schematic illustrations of an iterative method of achieving synchronisation;

FIG. 15 is a diagram illustrating a common sync signal principle.

Figure 1:
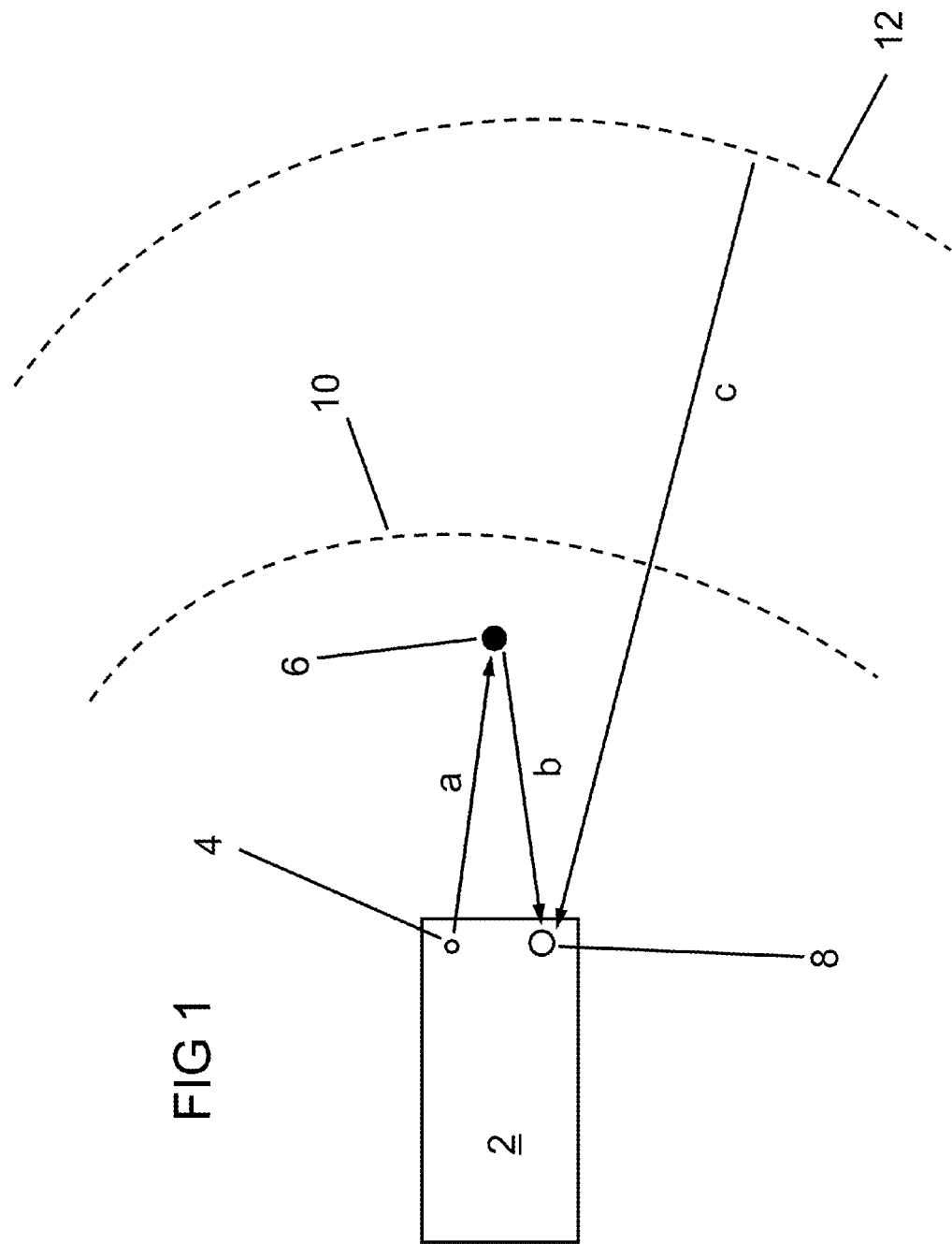
FIG. 1 is a schematic illustration of an exclusion zone around a device in accordance with the invention.

Turning first to FIG. 1 there may be seen a portable electronic device 2 comprising an ultrasonic transmitter 4 which transmits ultrasonic signals a. The signals are reflected by an input object 6 and the reflected signals b are received by an ultrasonic receiver 8. The device 2 may be controlled by movements of the input object 6 (e.g. a user's hand) which are detected by the received signals. In practice more than one receiver and/or transmitter would typically be provided to give adequate resolution. The details of the interface are, however, not essential to the present description and only one transmitter and receiver are shown for simplicity.

The time taken for a signal to pass from the transmitter 4 to the receiver 8 is the sum of the times of flight of the transmitted and reflected signals a, b. The device 2 may be configured so that it is only responsive to signals which have an aggregate time of flight below a maximum threshold. This threshold defines the edge of an ellipsoid 10. The region inside the ellipsoid 10 is referred to as the region of interest. If an input object is inside the ellipsoid boundary 10 the device 2 will be responsive to it, but if it is outside the boundary 10, reflections of the signal from it will be ignored. This may be implemented in a straightforward manner in the device 2 by responding only to reflected signals b received during a predetermined time window after transmission. The end of the time window correspond to the maximum time of flight. Physically this sets the dimensions of the ellipsoid boundary 10 taking account of the signals' speed of propagation. The beginning of the time window may be a short time after transmission so as to ignore the 'direct path' signal passing directly from the transmitter to the receiver.

If another device is in the vicinity of the first device 2, there is a risk of interference if signals c it transmits are received (directly or after reflection) by the first device 2 during the time window in which it is listening for reflections from its input object 6. However as will be explained in more detail below with reference to FIG. 2, this can be avoided if other devices have synchronised transmissions and remain outside an exclusion zone delineated by a spherical boundary 12 centred on the receiver 8.

The radius of the zone 12 is at least as great as the maximum time of flight which defines the region of interest boundary 10, with some margin for safety, say 10%. This therefore offers a simple way of ensuring that there is no interference between multiple devices, regardless of how many there are. To give a typical example the region of interest may be approximately 30 cm in diameter (albeit slightly elliptical) in which case the exclusion zone 12 will have a diameter of at least 60 cm.

Figure 2:
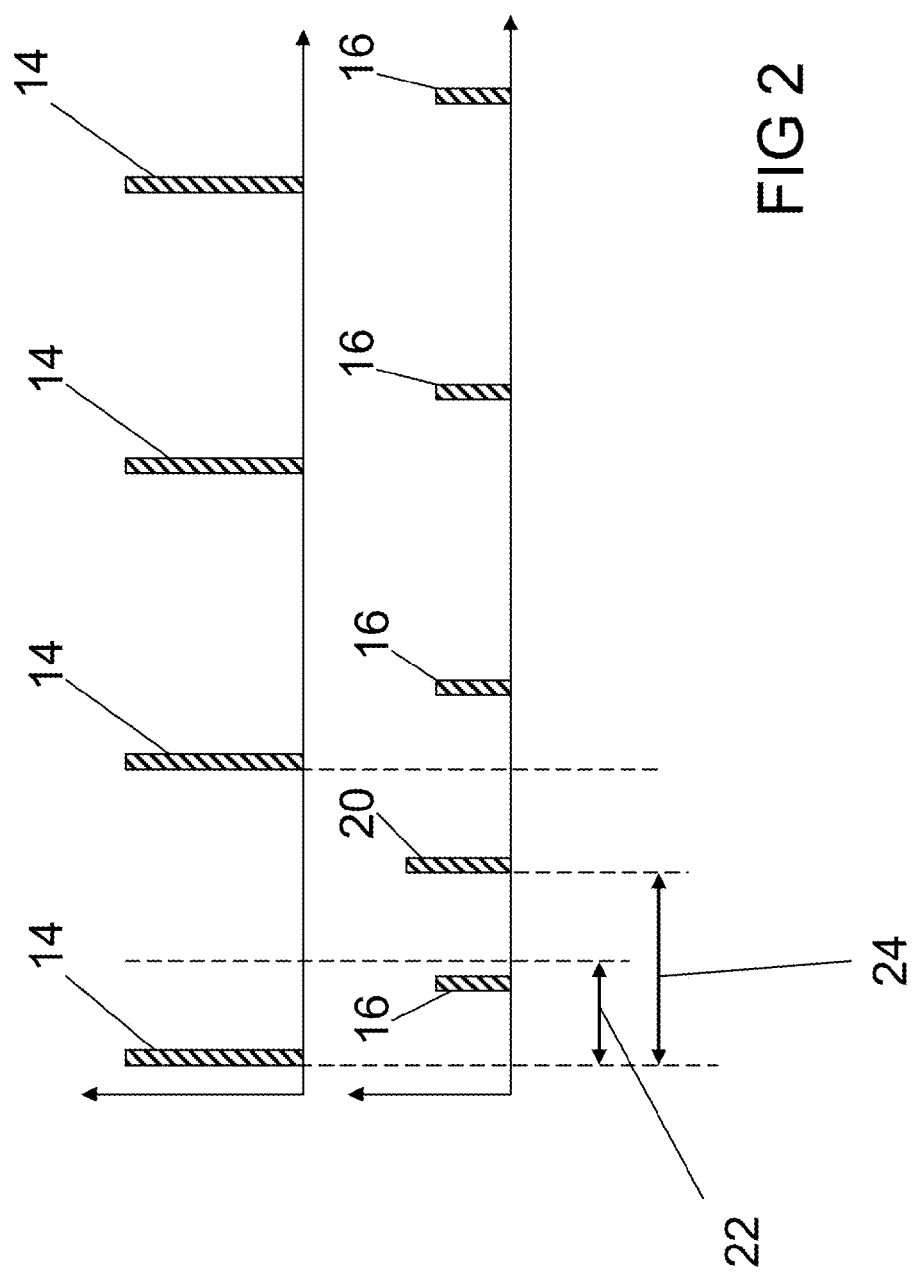
FIG. 2 is a timing diagram showing how synchronisation can avoid interference.

Referring to FIG. 2. there may be seen a schematic timing diagram illustrating the advantage of synchronising transmissions. The upper part of the diagram shows the regular signals 14, e.g. chirps, transmitted by a device 2 operating a touchless interaction mode. It should be understood that since this diagram is purely schematic the signals 14 are not intended to be an accurate representation of a chirp, it is only their timing which is of relevance to this explanation. The lower part of the diagram shows the signals received by the receiver 8. As will be seen, a short time after each transmission 14, a reflection 16 is received from the input object 6. Since the reflection 16 is within a predefined time window 22, the reflection is used to control the device as part of its touchless interaction mode. The end of the time window 22 corresponds to the maximum time for the signal 14 to be reflected from an object 6 inside the region of interest boundary 10. It therefore also corresponds to the time taken by a signal from the exclusion zone boundary 12 to reach the receiver 8.

Also visible on the lower part of the diagram is a signal 20 which has been -transmitted by another device transmitting in synchrony with the first device 2. Since the signal 20 is the 'direct path' signal from the second device (i.e. without undergoing any reflection) it has a higher amplitude than the reflection signal 20 despite emanating from further away. However since the second device is outside the exclusion zone 12, the time 24 taken for its signal 20 to reach the receiver 8 of the first device places the signal outside the receive window 22. It is therefore a simple matter to disregard the signal 20 and thereby avoid falsely attempting to interpret it as an input to the device 2. Interference between the devices is thus avoided. Moreover the same will be true for any devices outside the exclusion zone 12.

However instead of ignoring the signal 20 completely, its timing could be used to calculate the time of flight (since the time of transmission is known) and thus derive a distance to the second device. Indeed if the device 2 in fact has more than one receiver as would be typical it may be possible to estimate the actual location of the second device. The distance or location of the device may be indicated to the user via a display on the first device and/or may be used to implement a feature involving both devices.

There are many possible ways in which two or more devices may be synchronised to have their transmissions taking place at the same time or at least substantially the same time. One example is for the devices to base their transmissions on timing derived on an external radio frequency (RF) signal such as from a telecommunications network or a satellite signal. This is illustrated schematically in FIG. 3. It may be seen that a first portable electronic device 31 is equipped with an ultrasonic transmitter 32 and an ultrasonic receiver 33. It receives an RF synchronisation signal (e.g. by means of an internal aerial—not shown) from an external transmitter 34. The device 31 uses the RF sync signal to base the timing for its ultrasound signals. Similarly a second device 35 also has an ultrasonic transmitter 36 and an ultrasonic receiver 37. It receives the same RF synchronisation signal form the external transmitter 34. The second device 35 then also uses the RF sync signal to base the timing for its ultrasound signals so that it is automatically synchronised with the first device 31. Clearly any number of devices can be added and automatically synchronised.

Another example is for an RF signal to be transmitted from one device to another. This is illustrated schematically in FIG. 4. Here the first device 41 has both an ultrasound transmitter 42 and an RF transmitter 43. The first device transmits an RF sync signal which can be received by a second device 44 and used to synchronise the transmissions of the second device's ultrasound transmitter 45. Various protocols for this are possible. One example of a suitable protocol would be for each device to transmit an RF synchronisation pulse periodically but to adjust its pulse timing both of the RF pulses and ultrasonic chirps if it receives a pulse before its next transmission is due. This would lead to rapid synchronisation between any devices in the vicinity. The advantage of RF synchronisation is that propagation delays can be treated as negligible.

Figure 5:
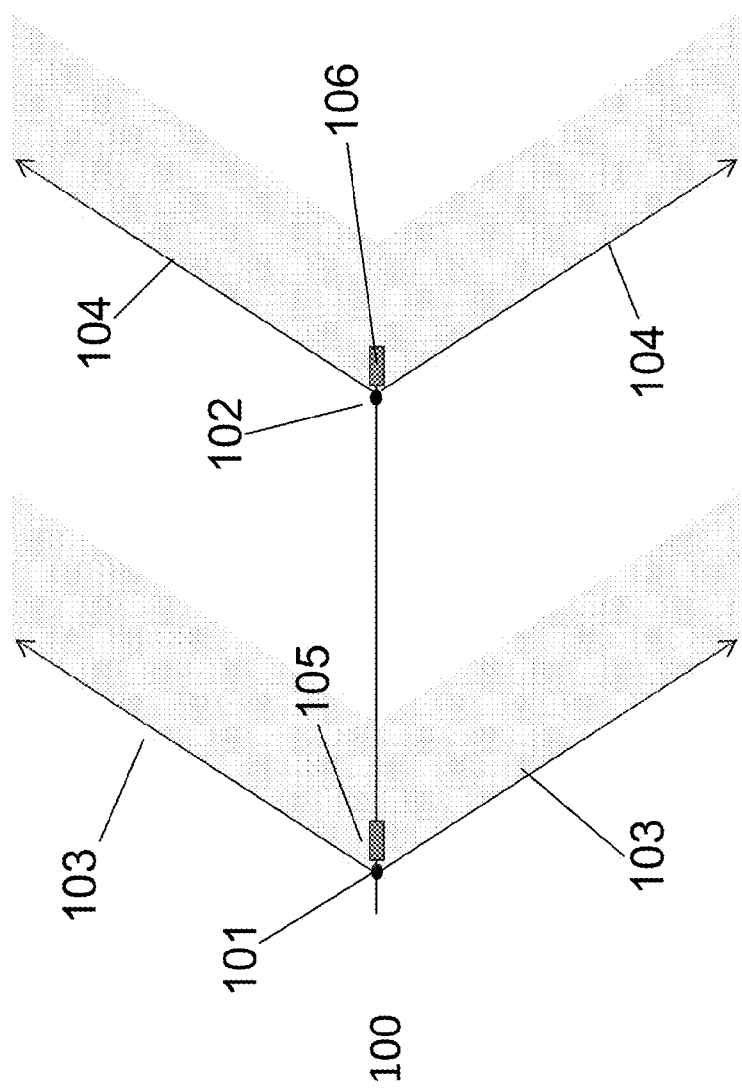

Another approach to synchronising multiple devices will now be described with reference to FIGS. 5 to 12. FIG. 5 shows a schematic diagram representing two successive ultrasonic chirp transmissions 101, 102 from a portable electronic device 100. The diagram shows time in the horizontal direction and distance in the vertical direction. Each transmission 101, 102, therefore gives rise to a signal 103, 104 propagating in all directions (only one spatial dimension is represented in these diagrams. The shaded region represents the possible reflections from the input object and surround objects such as walls, tables etc.

After each transmission a time window 105, 106 is defined which corresponds to the maximum time of flight for a reflection from an object in the region of interest as was explained above with reference to FIGS. 1 and 2.

Figure 6:
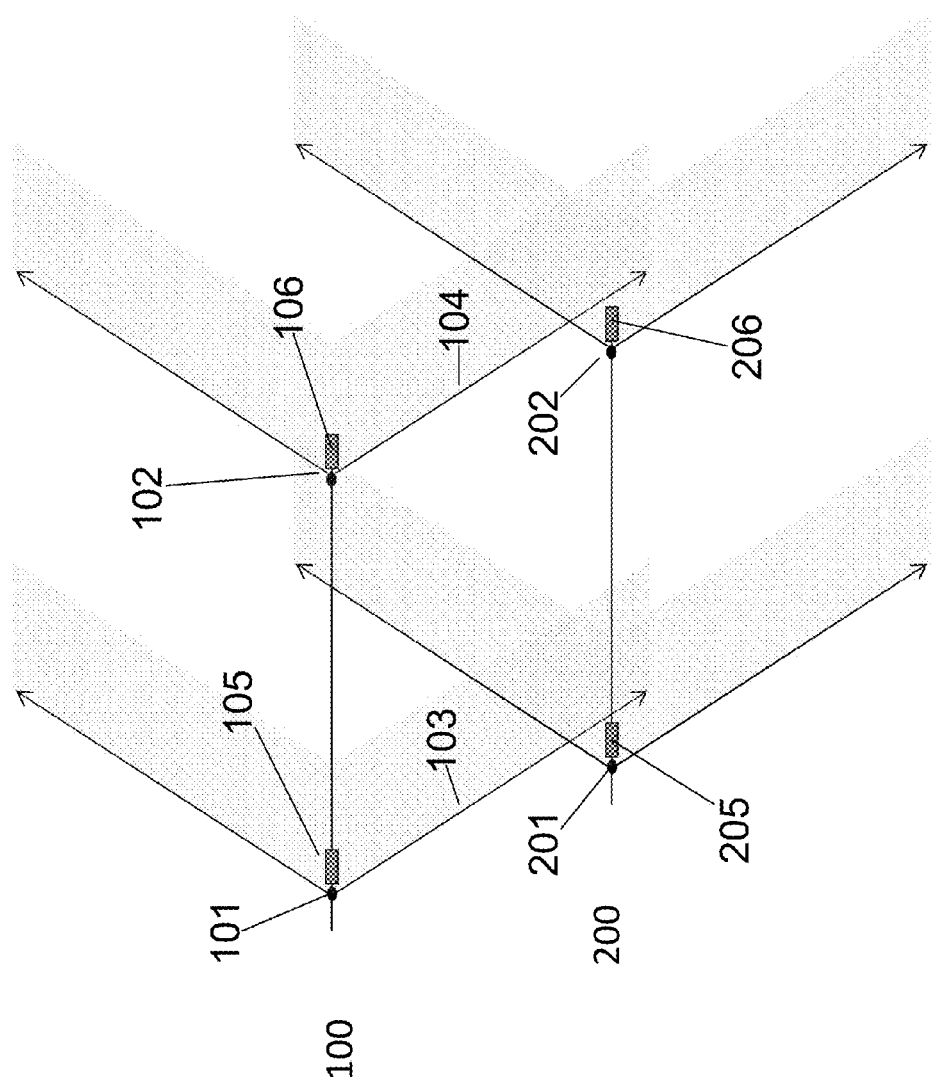

FIG. 6 shows what happens when a second device 200 is introduced. The second device 200 also transmits the same ultrasonic chirps at the same rate as the first device 100 however immediately before the situation shown in FIG. 6 it skipped a transmission and listened for transmissions, thereby receiving a transmission from the first device 100. Then, as FIG. 6 shows, the subsequent transmissions 201 from the second device are timed such that their time windows 205, 206 corresponding to the region of interest of the second device 200 are completed before the signals 103, 104 are received from the first unit. Interference between the transmissions and echoes of the first and second devices 100, 200 is thus avoided as previously explained. It will be noted that at this point the respective transmissions 101, 201 and 102, 202 from the respective devices 100, 200 do not occur at exactly the same time, but as will be shown below the algorithm tends towards that.

Figure 7:
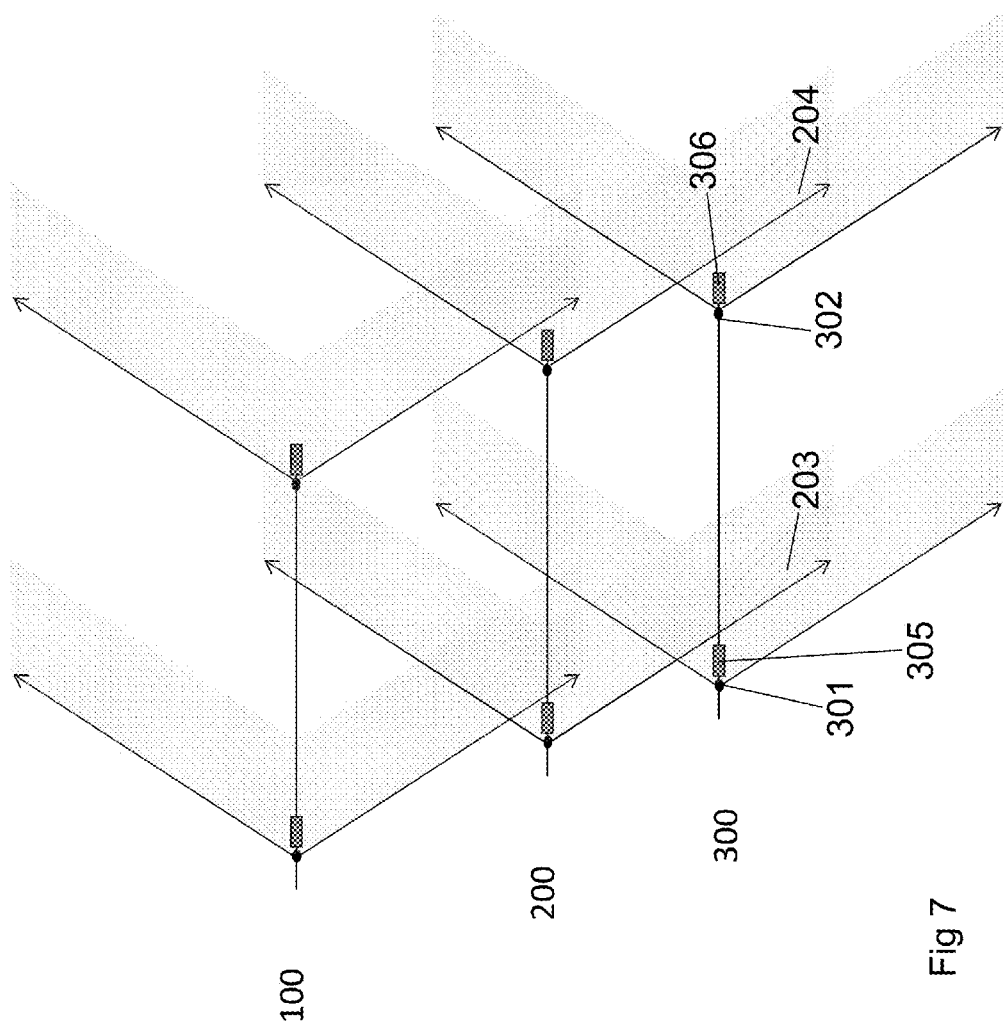

FIG. 7 shows the effect of introducing a third device 300 which is further still from the first device 100. The behaviour is exactly analogous to that displayed by the second device 200 in FIG. 2 and thus the result is that the third device 300 times its transmission 301, 302 such that the corresponding ROI time windows 305, 306 occur ahead of receipt of the signals 203, 204 from the second device. This avoids interference between the signals and echoes.

Figure 8:
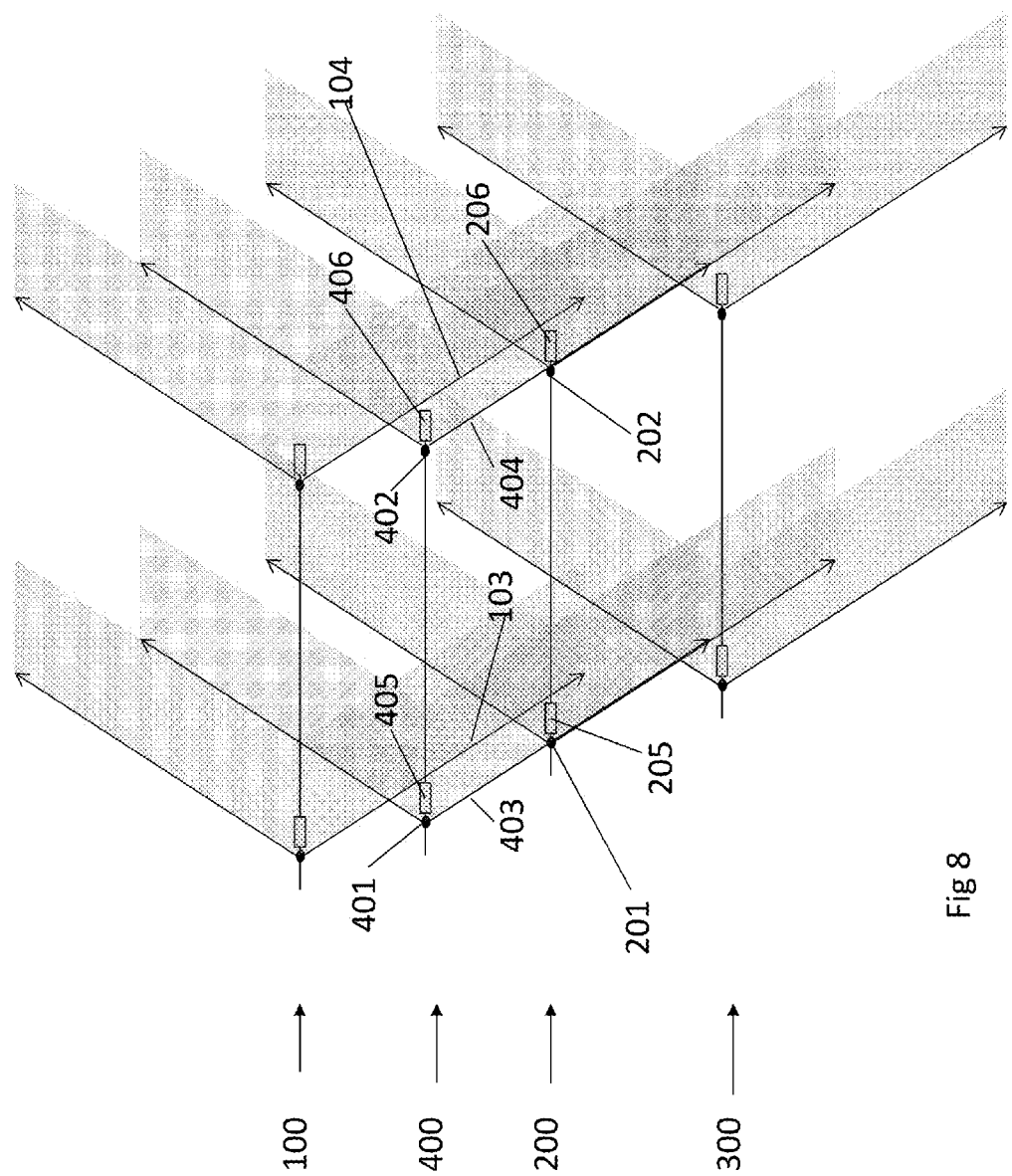

FIG. 8 shows the effect of the entry of a fourth device 400 physically between the first and second devices 100, 200. As in the earlier cases, the new device 400 times its transmissions 401, 402 so that the corresponding time windows 405, 406 occur before the signal 103, 104 is received from the first unit. However this has the inadvertent effect of interfering with the time window 205, 206 of the second device (in fact as depicted the signal 403, 404 from the fourth device arrives at the second device at virtually the same time that it makes its own transmission 201, 202).

Figure 9:
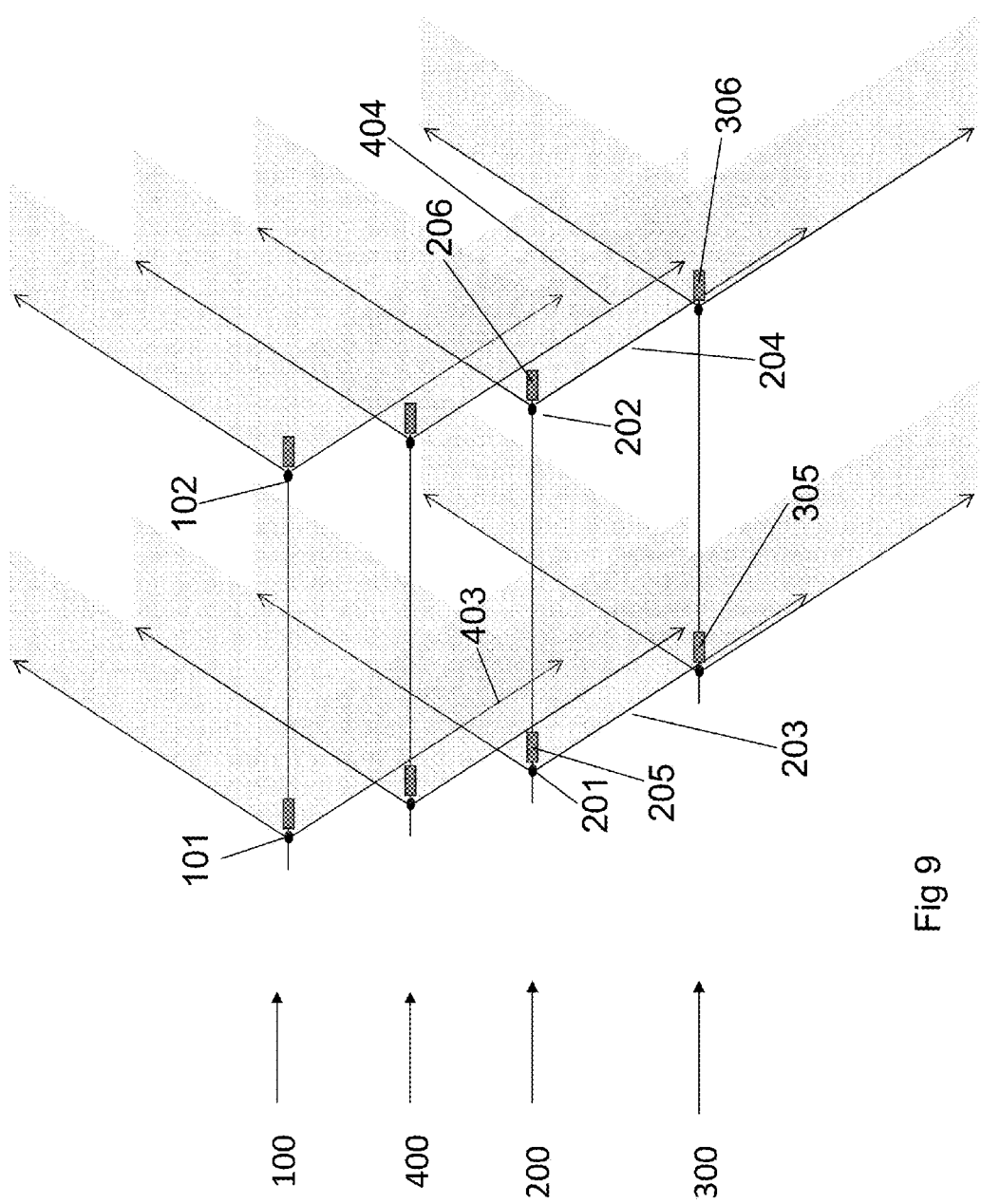

FIG. 9 shows the knock-on effect of the situation set out in FIG. 8. Here the second device 200 has brought its transmission 201, 202 forward in time to remove the conflict with the fourth device—i.e. the signals 403, 404 from the fourth device 403, 404 are no longer in conflict with the windows 205, 206 of the second device. It can be seen that the result of this is to bring the transmissions 201, 202 of the second device into closer synchrony with those of the first device 101, 102. However the shift in the timing of the transmissions 201, 202 of the second device means that they are now in conflict with the time windows 305, 306 of the third device.

Figure 10:
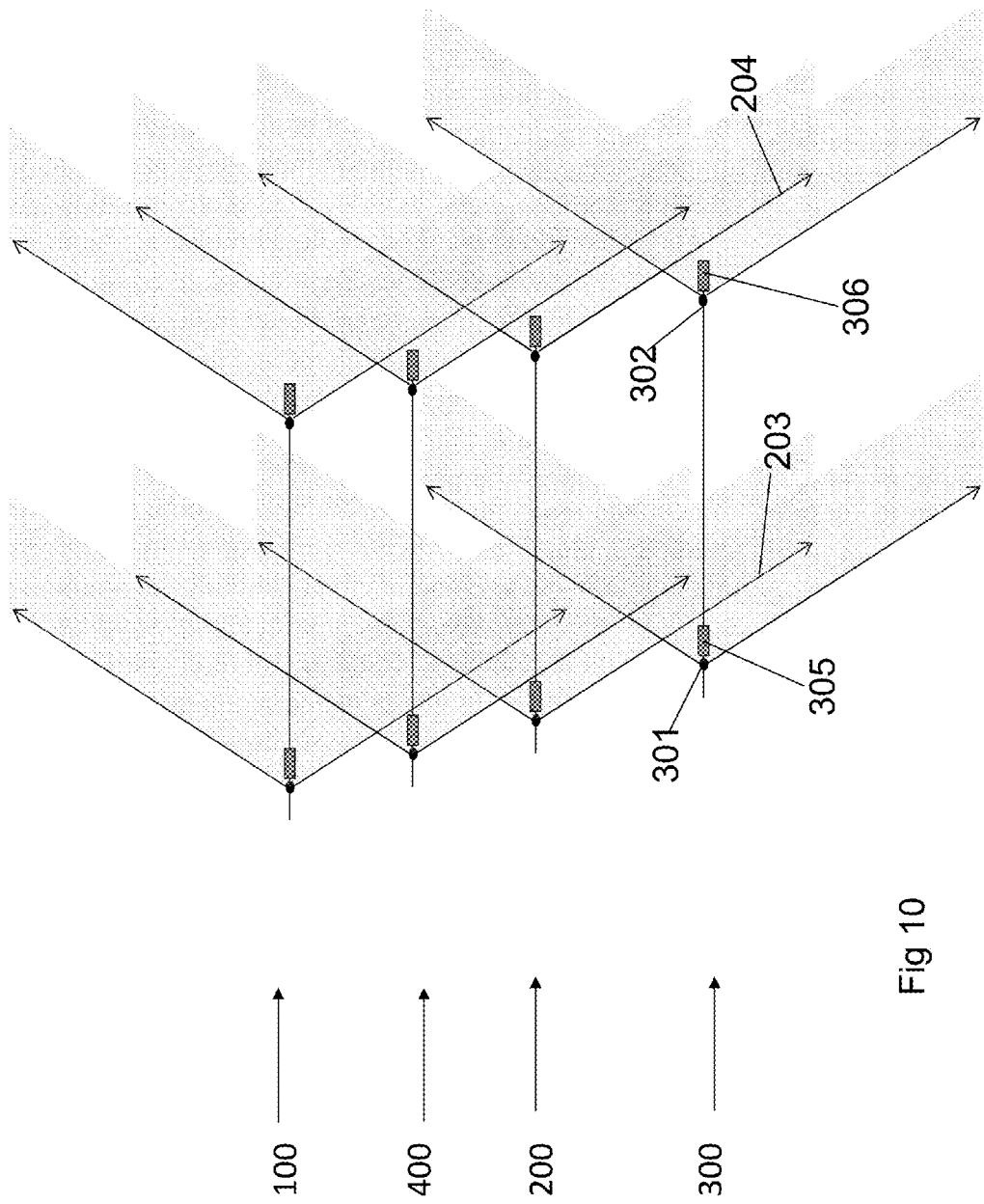

The conflict between the second and third devices 200, 300 is removed in FIG. 10 by the third device re-timing its transmissions 301, 302 so that its timing windows 305, 306 are ahead of the signals 203, 204 arriving from the second device. Thus now all four devices 100, 200, 300, 400 can operate without conflict by iteratively bringing their transmission times into closer synchrony with one another. Thus it may be observed that the differences in timing of the transmissions between the devices is less in the stable situation of FIG. 10 than in the stable situation of FIG. 7. It may also be observed by comparing FIGS. 8 to 10 that the effect of a new device being introduced is that greater synchronisation 'ripples out' from one device to the other.

The above 'rippling out' giving rise automatically to greater synchronisation can also be seen in FIGS. 11 and 12 which show the effect of a fifth unit 500 appearing between the second and third devices 200, 300. The signals 503, 504 from this initially interfere with the time windows 305, 306 from the third device as shown in FIG. 11 but then the third device 300 shifts its transmissions 301, 302 so that its window is before the signal 503, 504 from the fifth device. This leads to all five devices operating without conflict and close to synchrony as may be seen in FIG. 12. The degree of synchronisation will be increased as more devices are added and as the devices are moved around (they are assumed to be static in the illustrations described above).

Thus it can be seen that in accordance with the embodiment described above a large number of devices can operate simultaneously without conflict and allowing new devices to join automatically by using the method set out. This does not require any communication between the devices beyond the signals they transmit anyway in order to operate their respective touchless interaction modes.

This method is not always guaranteed to work since if the devices are too close to one another—i.e. they are not separated by their mutual exclusion zones as explained with reference to FIGS. 1 and 2, no stable solution can be found which avoids the transmissions or echoes from one device arriving in the ROI time window of another device. However this can be addressed by giving a warning to the users of the respective devices that they are too close and either they can move further apart or one or more of them can turn off the signals used for the touchless interaction mode. Alternatively one or more of the devices may switch to an alternative collision-avoidance algorithm such as causing the devices deliberately to transmit out of synchronisation such that the transmissions and echoes of one may occur outside the ROI time window of the other.

An alternative method of synchronisation will now be described with reference to FIG. 13. In this method a number of portable electronic devices each having ultrasound touchless interaction modes are also able to communicate between themselves using two separate ultrasound channels (hereinafter referred to as channel 1 and channel 2) which are common to all of them and operate on different respective frequencies.

The devices are all arranged to transmit ultrasonic chirps signals at the same rate over channel 1. Each device is arranged to implement Carrier Sense Multiple Access/Collision Avoidance. This involves each device selecting a starting number C, e.g. C=2. The device then generates a random number N between 0 and C and waits for that number of timeslots (N) before transmitting its chirp. The device then listens to determine whether another device is also transmitting in the same timeslot. This is done by checking the amount of energy within the device's own chirp compared to the rest of the signal.

If another device is transmitting in the timeslot, the chirp transmission is treated as having failed and the original number C is doubled before the algorithm is repeated. If no other transmission is detected the chirp is treated as having been successfully transmitted and the number C is halved before the algorithm is repeated.

Figure 13:
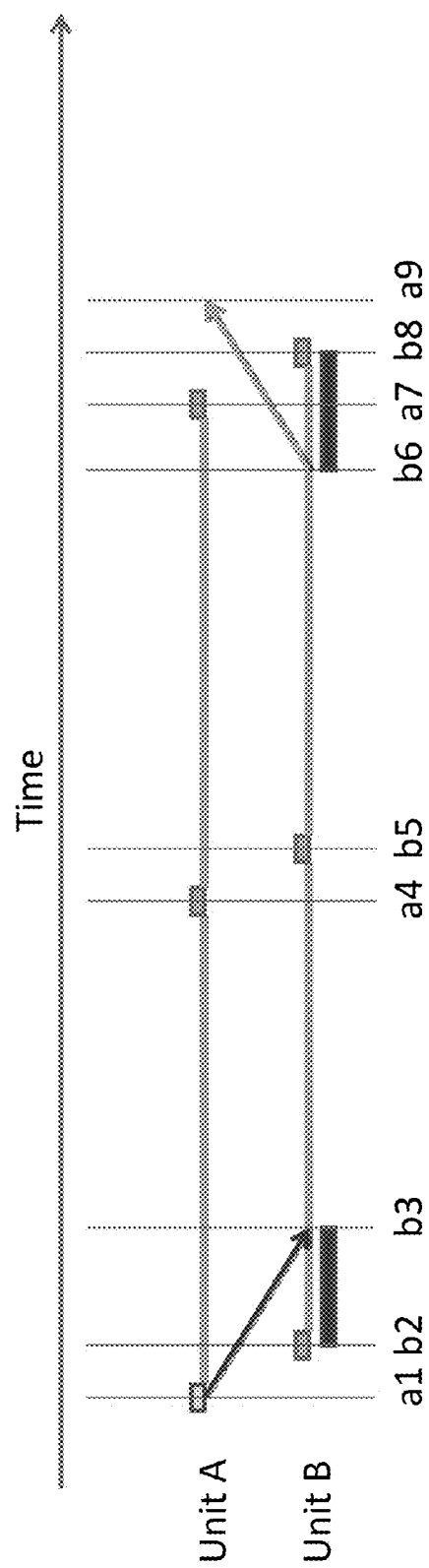
FIG. 13 is a schematic timing diagram illustrating an alternative synchronisation approach in accordance with the invention.

The timing diagram in FIG. 13 shows the method in operation between two devices: unit A and unit B. Initially at time a1, unit A transmits a chirp on channel 1. This is received by the other device, unit B at time b3. Time b3 is a time X into the timeslot of unit B. Unit B stores the value of X which is determined by the time taken for the chirp to travel from unit A to unit B (a function of their mutual separation and the speed of sound) and by the offset between the starts of their respective timeslots—i.e. the extent to which they are out of synchronisation. Time a is the beginning of unit A's next timeslot. Similarly time b5 is the start of unit B's next timeslot b8. During this timeslot unit B transmits a chirp back on channel 2. It transmits the chirp at a time b6 which is a time X before the end of the timeslot, the value of X having been previously stored as mentioned above.

The reply signal is received by unit A on channel 2 at time a9 which is a time P after the start of the next timeslot a7 of unit A. It can be shown that this interval P is equal to twice the offset between the timeslots of units A and B—i.e. P=2*(b2-a1). Thus unit A need only measure the interval P and halve it to determine the offset between the timeslots b2-a1. Unit A can then adjust its transmissions by this amount so that they are in synchrony as required.

Of course this process can be repeated with each of the other devices present so that they are all synchronised. So if two devices, units A and B are synchronised but units C and D are not, then when unit C requests synchronisation from other units (by sending a chirp on channel 1) it will observe a simultaneous reply from units A and B (because they are already synchronised). The summed amplitude from units A and B will be greater than that from unit D and thus by selecting the reply with greatest amplitude, unit C can acquire synchronisation from units A and B. Unit D can then do the same. This enables synchronisation to 'spread outwards' in the network by ensuring that 'new' units synchronise with the majority of the network.

Figure 3:
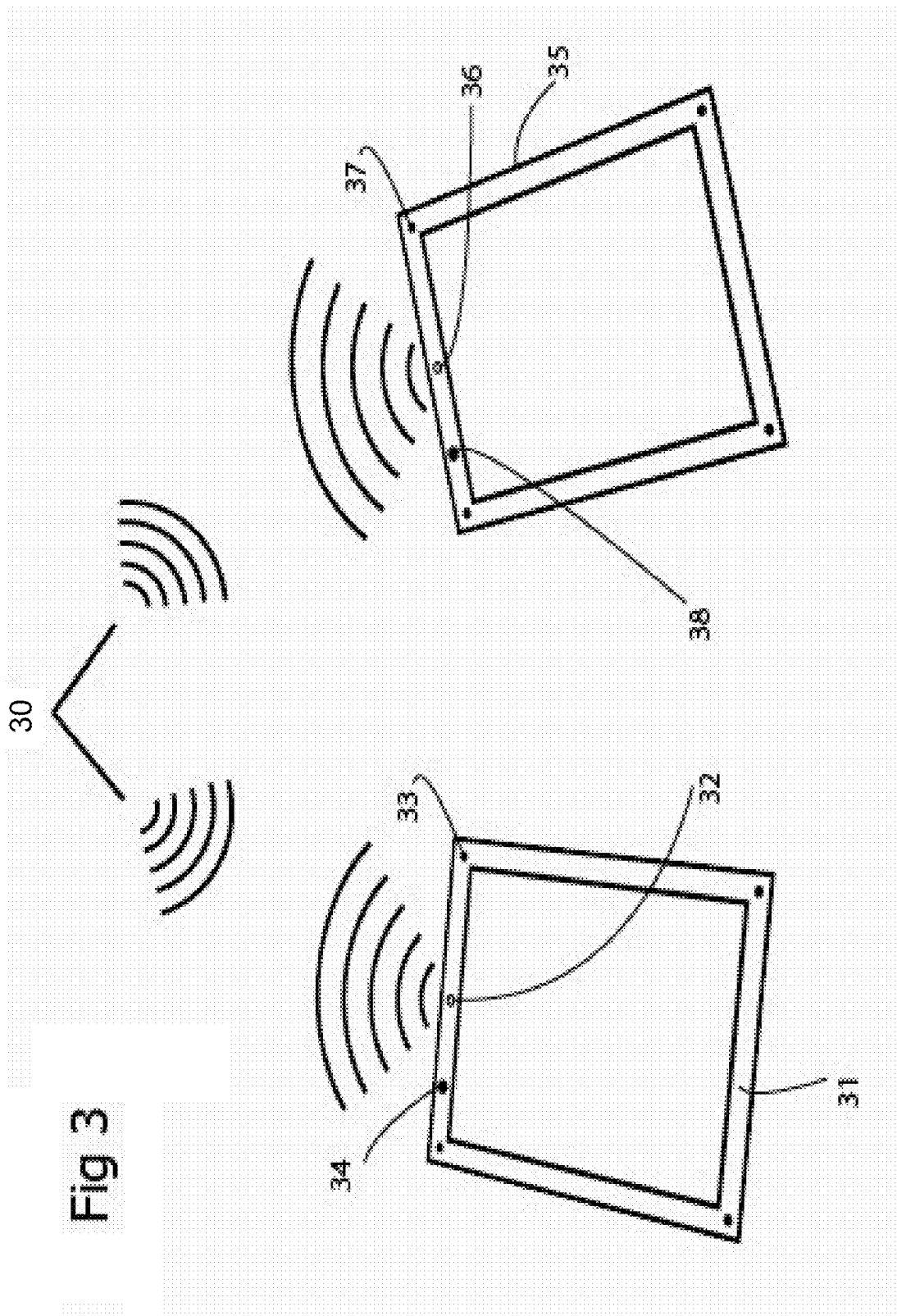
FIG. 3 is a schematic illustration of a system in which an external RF synchronisation signal is used.
Figure 4:
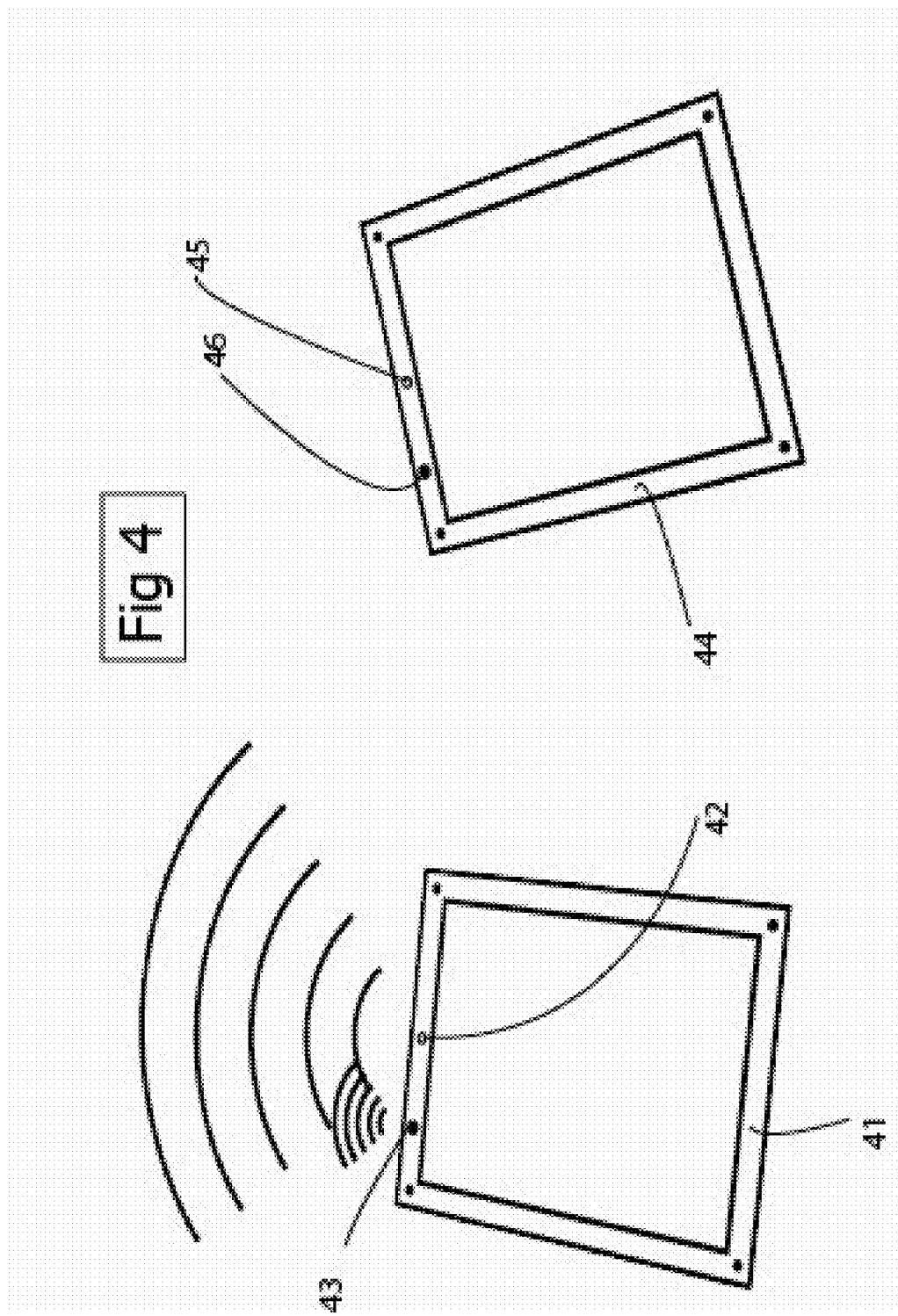
FIG. 4 is a schematic illustration of a system in which an RF synchronisation signal is passed between devices.
Figure 14:
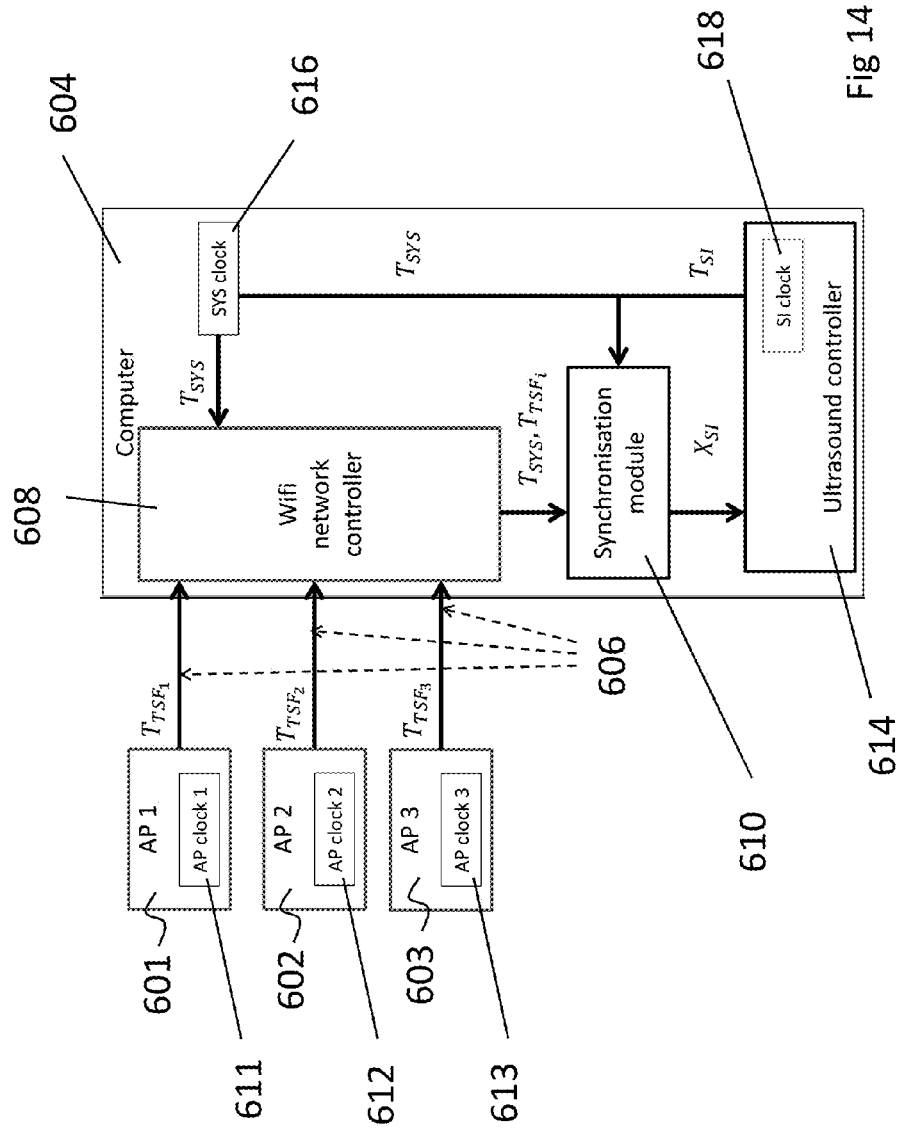
FIG. 14 is a block diagram showing another embodiment of the invention using WiFi access points fro synchronisation.

FIGS. 14 and 15 illustrate schematically another possible embodiment of the invention which follows on from the principles of the embodiments described with reference to FIGS. 3 and 4 above. In this embodiment a signal from a WiFi router or access point is used to synchronise devices as will be explained.

Turning first to FIG. 14 there can be seen schematically three different WiFi access points (APs) 601, 602, 603 and an electronic device 604 which could be a laptop, smartphone, tablet computer or the like. The APs 601, 602, 603 each have a respective independent one mega-Hertz clock 611, 612, 613 known as a Timing Synchronisation Function (TSF) clock. The APs 601, 602, 603 transmit regular signals known as beacons 606 which, amongst other things, contain the transmission time of the respective TSF clock 611, 612, 613.

The electronic device 604 comprises a number of different modules. One of these is the WiFi network controller 608 which governs the communication with the access points 601, 602, 603. The device also comprises a synchronisation module 610 and an ultrasound controller module 614. The device 604 will typically include a number of clocks. One of these is a local system clock 616 which maintains the ordinary time of day and the date, The local system clock (SYS clock) has, by default, rather low accuracy, e.g. around 15 ms, but has the benefit of be ubiquitously accessible by most system components, including low-level network drivers. Devices and computers typically have at least one high-precision clock (typically running at 1-2.5 MHz). but unfortunately this is not usually similarly accessible through the system.

The ultrasound controller 614 transmits chirps at regular intervals. it also maintains an index count of how many chirps have been transmitted since system start-up. As the controller 614 causes the device to transmit chirps at a constant rate, this effectively also becomes a clock, referred to herein as the sample index clock (SI clock) 618.

As will be described below the device 604 and any other devices in the vicinity can be made to synchronise their ultrasound transmissions based on the information in the AP beacons 606.

Synchronisation is achieved by estimating the drift and offset between one of the AP clocks 611, 612, 613 and the SI clock 618. This enables chirps to be transmitted at points in time which are specified relative to the AP clock 611, 612, 613. By estimating drift and offset, it can be estimated when these points in time occur defined in terms of timestamps of the SI clock 618, and thus establish synchronized transmission. As will be discussed below, a particular AP is selected by the devices to be used, either by directly communicating with one another or through an intermediate online service.

While it would be possible to estimate these parameters directly between the AP clock 611, 612, 613 and the SI clock 618 (by for instance performing linear regression between AP clock timestamps and SI clock timestamps), it is in practice easier to synchronize the AP clock 611 with the SYS clock 616, and then to synchronize the SYS clock 616 with the SI clock 618 as will be described.

As mentioned the access points 601, 602, 603 transmit beacons 606 containing timestamp information about their respective local clocks 611, 612, 613. Such beacons are typically transmitted at a rate of approximately 10 Hz from each individual access point. Connected devices will receive such beacons at their native rate (10 Hz) from the access point they are connected to. From access points that the devices are not connected to, devices will receive beacons at a significantly lower rate (typically approximately 0.25 Hz). This is due to typical limitations in the WiFi radio interface 608 which require it to scan through other frequencies to listen for other beacons, thereby not allowing it to receive most of the beacon transmissions from a given AP. For maximum precision it is desirable (but not essential) that all devices are connected to the same AP.

These timestamps $T_{TSF_i}$ are received by the Wi-Fi network controller 608, and the timestamp of reception is set to $T_{SYS}$, which is relative to the system clock 616. The combined information $T_{SYS}$, $T_{TSF_i}$ is supplied to the synchronisation module 610.

Separately, simultaneous information from the SI clock 618 and the SYS clock 616 is collected by the synchronisation module 610.

Together, all this information is used to provide timestamps $X_{SI}$ in the SI clock 618 frame of reference to the ultrasound controller 614, which indicate when the chirps should be transmitted.

The synchronisation module 610 first collects information about nearby access points. In this embodiment t does this by using the list, which can be provided by Windows® and its underlying network interface software drivers, of when the latest beacon 606 was received from all nearby access points 601, 602, 603. This list contains at least the following information for each access point: timestamp of transmission from the AP clock 611, 612, 613; timestamp of receipt (usually from the SYS clock 616); Media Access Control (MAC) address—a 48-bit integer which uniquely identifies a particular AP; and the Service Set Identifier (SSID) which is a human readable name of the network, which may be shared amongst multiple AP's to enable the user to roam between access points as he or she moves around in a building.

This provides the information necessary to synchronize the TSF clock and the SYS clock. Such timestamp information is collected over a period of time for the selected access point. Typically, 2-5 seconds is sufficient initially.

For the purposes of the following description it will be assumed that the device 604 is connected to the first AP 601 by an ordinary WiFi connection and that it is using this for synchronisation.

The information collected as set out above is used to estimate the drift and offset between the AP clock 611 and the device's local clock 616.

The actual synchronisation is done using one of the following methods. In both cases $T_{TSF}(i)$ is a list of TSF timestamps received in beacons 606, and $T_{SYS}(i)$ is a corresponding list of timestamps of the local clock 616. It is desired to estimate drift $D_{TSF}$ and offset $O_{TSF}$ such that ideally $$T_{SYS}(i) = T_{TSF} \cdot T_{TSF}(i) + O_{TSF}$$

This can of course be done by normal linear regression, by finding $D_{TSF}$ and $O_{TSF}$ such that the following function is minimized with respect to the parameters $D_{TSF}$ and $O_{TSF}$:

$$f(D_{TSF}, O_{TSF}) = \sum_i (T_{SYS}(i) - D_{TSF} \cdot T_{TSF}(i) - O_{TSF})^2$$

This relies on an assumption that measurement noise is mostly Gaussian and due to system latencies.

For some systems, it has been found in experiments that most of the noise is due to quantisation of the SYS clock 616, not system latencies. However by incorporating information about the accuracy of the SYS clock, results can be improved. The main disadvantage of the SYS clock is reported timestamps are rounded to the closest time quantum $Q_{SYS}$. However the Applicant has found that by using the system calls NtQueryTimerResolution and NtSetTimerResolution the accuracy of the system clock 616 can be increased to 0.5 ms. In other words $Q_{SYS}$ can be reduced from $Q_{SYS}$=15 ms to $Q_{SYS}$=0.5 ms.

This information is incorporated by not penalizing deviations that are due to clock quantisation. This is done by optimizing the function g instead with respect to $D_{TSF}$ and $O_{TSF}$.

$$g(D_{TSF}, O_{TSF}) = \sum_i |r(T_{SYS}(i) - D_{TSF} \cdot T_{TSF}(i) - O_{TSF})|^a$$

where $$r(x) = \begin{cases} -x & \text{if } x < 0 \\ x - Q_{SYS} & \text{if } x > Q_{SYS} \\ 0 & \text{otherwise} \end{cases}$$

This function can be minimized by for instance using the simplex (Nelder-Mead) method.

The next step is that the SYS clock 616 and the SI clock 618 are synchronised by collecting simultaneous samples of the SYS clock 616 and the SI clock 618. This is done by first sampling both clocks at regular intervals, and then estimating drift and offset.

Depending on implementation of the ultrasound software, sampling of the two clocks can be done in at least two different ways.

If the ultrasound software implementation allows it, the software can itself measure the SYS clock 616 at repeated intervals when it knows that a particular sample index has been transmitted. It can then expose a list of $T_{SYS}(j)$ and $T_{SI}(j)$ which contains simultaneous samples of the SYS clock 616 and the SI clock 618.

If the ultrasound software does not allow this, external software must sample the SI clock 616 and the SYS clock 618. Again, knowledge about the quantisation of the SYS clock 616 (and the SI clock 618) can be used to improve results.

By repeatedly and rapidly sampling the two clocks, the clock stamp can be collected when, for example, the SYS clock 616 steps from one timestamp to the next timestamp (i.e. for 0.5 ms resolution, this could be from 10000.0 ms to 10000.5 ms), and only using measurements close to such time steps.

By doing this, quantization noise is effectively reduced to a minimum. Linear regression is then used to estimate drift $D_{SI}$ and offset $O_{SI}$ such that $$T_{SI}(i) = D_{SI} \cdot T_{SYS}(i) + O_{SI}$$

The synchronisation module 610 then uses the estimated drifts and offsets to transmit synchronously.

It is assumed that the device 604 and other devices in the vicinity are arranged to use a common scheme for when chirps should be transmitted. This could be pre-defined (i.e. every 10 ms), or an online service could be employed to agree on this.

For the purposes of discussion here, it is assumed that the devices 604 are arranged to transmit every C ms, where C is defined using AP clock 611 time, so transmission times $X_{TSF}$ in AP clock times are $$X_{TSF} = nC$$

where n is the chirp number. This means that in SYS clock 616 times the transmission times $X_{SYS}$ will be $$X_{SYS} = D_{TSF} \cdot X_{TSF} + O_{TSF} = D_{TSF} nC + O_{TSF}$$

which further can be converted to SI clock 618 timestamps $X_{SI}$ which can be used for actual transmission:

$$X_{SI} = D_{SI} X_{SYS} + O_{SI} = D_{SI}(D_{TSF} nC + O_{TSF}) + O_{SI}$$

The procedure set out above can be used for using the beacon 606 from an AP 601 to allow the device 604 to transmit ultrasound chirps synchronously with other nearby devices. It is important therefore in order to enable this synchronisation, that any other devices which are within an area (e.g. a room) time their transmissions using the same timing source.—e.g. a common access point.

As all access points transmit a 48-bit integer (MAC code) which uniquely identifies them, this information can be used for agreeing on a particular access point.

In order to enable this, all devices within a room must first establish which access points that they all can receive beacons from. This can be done by each device first collecting beacons from all access points (as mentioned above), and then exchanging this information with all the other devices in the room.

This exchange can happen locally (by devices directly exchanging information with each other) or by sending this information to a central server, which assists in selecting the access point.

The actual selection of the common access point can be performed using any of, or a combination of, several criteria. One such criterion might be the number of devices that can connect to a particular AP. Best synchronisation results are achieved if all units are connected to the same AP. Another possible criterion might be the clock quality which can be derived by estimating $E_{TSF}$ and $D_{TSF}$ for each access point and using an error term to indicate quality. Another possible criterion to apply is selecting the AP which has the grestest number of devices than can receive beacons from it. More simplistically, a simple signal strength criterion could be applied. Any combination of these or other criteria might be used as the basis for a compound algorithm.

If the criteria set out above do not yield a clear answer, the devices could be arranged to default to selecting a preferred AP based simply on MAC addresses (e.g. in case of all other parameters being equal, the access point with the lowest 48-bit MAC address is selected)

This selection of access point for synchronisation can be repeated at regular intervals to provide robustness change in availability of access points etc.

A potential limitation of the process set out above for selecting a common AP is that problem with the above method is that devices may not be able to receive beacons from the same AP. This can happen in a situation like the one shown in FIG. 15.

In this case, the first device 604 is able to receive beacons only from a particular AP 601, and the second device 604' is only able to receive beacons from a different AP 602. As a result of the relative separations, the first device is not able to receive beacons from the second AP 602, and the second device 604' is not able to receive beacons from the first AP 601. To address this the devices 604, 604' can relay time information. They can do this by the device 604 becoming an access point itself in addition to being connected to the original access point). This means that they will themselves start transmitting beacons containing time information relative to the access point they are connected to. This could be accomplished by enabling the Virtual WiFi component included in recent versions of Windows®

To utilize this relayed information, the MAC address of each device's wireless network card is reported to other devices, so that the other devices will know which apparent access points are real sources and which are only relays of time information.

Once synchronisation has been established then at predefined intervals (or if the selected access point becomes unavailable), the procedures set out above are repeated from the step at which the units agree on which access point to use through to determining offsets and drifts etc.

In the description above, it is assumed that any device is connected to the access point (either a source AP or another device acting as a relay) from which it receives the timing information it requires for synchronisation. However this is not essential and in a variant described below, a device may be connected a a first access point but receive timing information for synchronisation from a second access point.

So in some cases, the devices may be connected to different access points. With most radios, this means that they will receive frequent beacon updates (10 Hz) from the access point they are connected to, and infrequent updates from remaining access points (approximately 0.25 Hz).

It is still possible to achieve synchronisation of such devices as long as they all receive beacons from a common access point, even if they are not connected to this access point. To achieve this, each device collects beacons both from the access point that they are connected to, and from the access point that is the synchronisation source. Turning back to FIG. 14 it can be assumed that a device 604 is connected to a first access point 601 and uses a second access point 602 for synchronisation.

There will thus be two lists of corresponding AP clock times ($T_{TSF_1}(i)$ and $T_{TSF_2}(k)$) and SYS times ($T_{SYS_1}(i)$ and $T_{SYS_2}(k)$). Synchronisation to the second access point 602 means estimating $D_{TSF_2}$ and $O_{TSF_2}$, and then reusing the procedure outlined above, applying $D_{TSF_2}$ and $O_{TSF_2}$.

If the radio were to receive beacons at a high rate (e.g. 10 Hz) from the second access point 601, the procedures previously described herein could be used directly to estimate $D_{TSF_2}$ and $O_{TSF_2}$. As previously explained however, because the device 604 is not connected to the second access point 602 it is likely to receive beacons from it at a much lower rate. However the procedure below can then be used.

First $T_{TSF_1}(i)$ and $T_{SYS_1}(i)$ are used to establish drift and offset $D_{TSF_1}$ and $O_{TSF_1}$, as i in the described earlier. The amount of data received from the first access point 601 allows these to be rapidly and precisely estimated.

The procedure continues by estimating $D_{TSF_2}$ as equal to $D_{TSF_1}$. This is done partially because relatively much less data is received from the second access point 602 but also because the 802.11 Wi-Fi standard stipulates that all AP clocks should have very precise oscillators.

To estimate $O_{TSF_2}$, $D_{TSF_1}$ and $O_{TSF_1}$ are used to calculate when beacons from the second access point 602 were received, timestamped to the clock 611 of the first access point. This is done by noting that $T_{SYS_1}(i) = D_{TSF_1} \cdot T_{TSF_1}(i) + O_{TSF_1}$. By substituting $T_{SYS_2}(k)$ for $T_{SYS_1}(i)$ and inverting the equation, it can be estimated when beacons $T_{SYS_2}(k)$ where received in clock time of the first access point 601 by calculating $$T'_{TSF_1}(k) = \frac{T_{SYS_2}(k) - O_{TSF_1}}{D_{TSF_1}}$$

The clock offset $O_{TSF_{1-2}}$ can now be estimated between the clocks 611, 612 of the two APs by averaging as follows $$O_{TSF_{1-2}} = O_{TSF_1} - O_{TSF_2} = \frac{1}{N}\sum_{k=1}^{N} \left(T'_{TSF_1}(k) - T_{TSF_2}(k)\right)$$

This can in turn be used to estimate $O_{TSF_2} = O_{TSF_1} - O_{TSF_{1-2}}$

With $D_{TSF_2}$ and $O_{TSF_2}$ estimated, the procedures outlined previously can be used to enable actual synchronized transmission.

Tests have shown that with two PC's connected to the same access point, the methods described above are capable of providing synchronisation between the two devices to within 0.1-0.2 ms, which is close to the noise floor limiting the precision with which synchronisation can be measured. Synchronisation is established within 1-2 seconds.

The invention claimed is:

1. An electronic device comprising:
a transmitter and a receiver for periodically transmitting first ultrasonic signals and receiving reflections of the transmitted first ultrasonic signals from an input object respectively, wherein the electronic device is configured to use said reflected signals as part of a user control interface and to control a function of the electronic device in dependence on said reflected signals, said device being further configured so as to:
detect ultrasonic signals transmitted by a further electronic device that detects corresponding reflected ultrasonic signals from a corresponding input object to control a function thereof, as potentially interfering signals reaching the electronic device;
adjust timing of subsequent ultrasonic signal transmissions by the electronic device based on the detected ultrasonic signals transmitted by the further electronic device, so that a timing difference between the transmissions of the electronic device and the transmissions of the further electronic device is reduced such that a time window corresponding to the round-trip time of flight for a signal transmitted by the electronic device and reflected from the input object terminates before a potentially interfering transmitted ultrasonic signal from the further electronic device can reach the electronic device in each period.

2. The electronic device as claimed in claim 1 arranged to collaborate with the further electronic device to implement a feature involving both electronic devices.

3. The electronic device as claimed in claim 1 configured to process signals from the further electronic device.

4. The electronic device as claimed in claim 1 configured to receive a signal from the further electronic device and to calculate a separation between the electronic device and the further electronic device.

5. The electronic device as claimed in claim 1 configured to give a warning to a user if the electronic device becomes aware that the further electronic device is within a predetermined exclusion zone.

6. The electronic device as claimed in claims 1 configured to switch to another interference-avoiding algorithm if the electronic device becomes aware that the further electronic device is within a predetermined exclusion zone.

7. The electronic device as claimed in claim 6 configured to issue a notification to a user and suspend its own transmissions if it detects that switching to another interference-avoiding algorithm has not been successful in preventing interference between the electronic device and the further electronic device.

8. The electronic device as claimed in claim 6 configured to communicate to the further electronic device if the electronic device becomes aware that the further electronic device is within a predetermined exclusion zone.

9. The electronic device as claimed in claim 8 arranged to carry out said communication over an RF channel.

10. The electronic device as claimed in claim 1 configured to transmit signals periodically but sometimes to refrain from transmitting a signal when dictated by the periodicity.

11. The electronic device as claimed in claims 1 comprising a local clock and being configured to use said local clock in conjunction with system calls.

12. The electronic device as claimed in claim 1 configured to transmit signals which follow a repeating pattern from one transmission to the next.

13. A method of operating at least first and second electronic devices, said electronic devices each arranged to periodically transmit ultrasonic signals and receive reflections of the transmitted signals from a respective input object, wherein at least one of the at least first and second electronic devices uses said reflected signals as part of a respective user control interface and controls a function thereof in dependence on said reflected signals, and wherein the first electronic device detects ultrasonic signals transmitted by the second electronic device as potentially interfering ultrasonic signals reaching the first electronic device, the method further comprising:

adjusting timing of subsequent ultrasonic signal transmissions by the first electronic device based on the detected ultrasonic signals transmitted by the second electronic device, so that a timing difference between the transmissions of the first electronic device and the transmissions of the second electronic device is reduced such that a time window corresponding to the round-trip time of flight for an ultrasonic signal transmitted by the first electronic device and reflected from the respective input object terminates before a potentially interfering transmitted ultrasonic signal from the second electronic device can reach the first electronic device in each period.

14. A computer software product provided on a non-transitory computer readable medium which is adapted, when run on suitable data processing apparatus to:

control an electronic device having a transmitter and a receiver, to periodically transmit first ultrasonic signals and receive reflections of the transmitted first ultrasonic signals from an input object respectively, wherein the electronic device is configured to use said reflected signals as part of a user control interface and to control a function of the electronic device in dependence on said reflected signals, wherein the electronic device detects ultrasonic signals transmitted by a further electronic device that detects corresponding reflected ultrasonic signals from a corresponding input obiect to control a function thereof, as potentially interfering signals reaching the electronic device; and adjust timing of subsequent ultrasonic signal transmissions by the electronic device based on the detected ultrasonic signals transmitted by the further electronic device, so that a timing difference between the transmissions of the electronic device and the transmissions of the further electronic device is reduced such that a time window corresponding to the round-trip time of flight for a signal transmitted by the electronic device and reflected from the input object terminates before a potentially interfering ultrasonic signal from the further electronic device can reach the electronic device in each period.

* * * * *